United States Patent
Mesiti et al.

(10) Patent No.: US 6,524,219 B2
(45) Date of Patent: Feb. 25, 2003

(54) METHOD AND A SYSTEM FOR CONTROLLING THE PROPULSION OF A MOTOR VEHICLE

(75) Inventors: Domenico Mesiti, Leini' (IT); Giancarlo Osella, Turin (IT); Attilio Porta, Turin (IT); Giovanni Ellena, Turin (IT); Massimo Fossanetti, Turin (IT); Massimo Lupo, Rivalta (IT)

(73) Assignee: C.R.F. Societa Consortile per Azioni, Turin (IT)

(*) Notice: Subject to any disclaimer, the term of this patent is extended or adjusted under 35 U.S.C. 154(b) by 0 days.

(21) Appl. No.: 09/919,805

(22) Filed: Aug. 2, 2001

(65) Prior Publication Data

US 2002/0019290 A1 Feb. 14, 2002

(30) Foreign Application Priority Data

Aug. 2, 2000 (IT) ...................................... T02000A0771

(51) Int. Cl.$^7$ .............................................. B60K 41/02
(52) U.S. Cl. .............................. 477/5; 477/3; 180/65.2
(58) Field of Search ........................ 477/3, 5; 180/65.2, 180/65.3, 65.4, 65.8

(56) References Cited

U.S. PATENT DOCUMENTS 6,018,198 A * 1/2000 Tsuzuki et al. ............ 180/65.2
6,176,807 B1 * 1/2001 Oba et al. .................... 101/333
6,360,834 B1 * 3/2002 Gauthier ..................... 180/53.5

FOREIGN PATENT DOCUMENTS

| DE | WO99/50084 | * 10/1999 | ............ B60K/6/04 |
| WO | WO01/56824 |   8/2001  |                       |

* cited by examiner

*Primary Examiner*—Charles A. Marmor
*Assistant Examiner*—Dennis Abdelnour
(74) *Attorney, Agent, or Firm*—Sughrue Mion, PLLC

(57) ABSTRACT

A first clutch and a second clutch, which are operable selectively, control the coupling of the rotor of a reversible electrical machine with the transmission and with the internal combustion engine, respectively. A control system is provided for implementing a stop-start function in which, in a stop stage, the internal combustion engine is disconnected from the electrical machine and from the transmission and is switched off, in first predetermined operating conditions of the vehicle and then, as a result of the occurrence of second operating conditions, such as a command imparted by the driver, in a subsequent start stage, is automatically restarted by means of the electrical machine operating as a motor, and is then reconnected to the transmission. The system is characterized especially by particular methods of controlling the clutches and the electrical machine during the start stage.

8 Claims, 2 Drawing Sheets

METHOD AND A SYSTEM FOR CONTROLLING THE PROPULSION OF A MOTOR VEHICLE

BACKGROUND OF THE INVENTION

The present invention relates to a system for controlling propulsion for a motor vehicle provided with:

an internal combustion engine, a transmission including a gearbox provided with associated actuator means, a reversible electrical machine which includes a rotor and a stator and which is interposed between the internal combustion engine and the transmission and can operate selectively as a generator and as an electric motor, a first clutch and a second clutch which can be operated selectively in order to control the coupling of the rotor of the electrical machine with the transmission and with the internal combustion engine, respectively, sensor means for providing electrical signals indicative of operating conditions of the vehicle, of the internal combustion engine, and of the electrical machine, and control means arranged to control the internal combustion engine, the electrical machine, the first clutch, and the second clutch, as well as the gearbox actuator means, in accordance with predetermined methods, in dependence on the signals provided by the sensor means, the control means being arranged, in particular, to implement a stop-start function in which, in a stop stage, upon the occurrence of first predetermined operating conditions of the vehicle, the internal combustion engine is disconnected from the electrical machine and from the transmission and is switched off and then, in a subsequent start stage, upon the occurrence of second predetermined operating conditions of the vehicle, is automatically restarted by the electrical machine, operating as a motor, and is then reconnected to the transmission.

A propulsion control system of this type is described in prior International patent application PCT/EP01/01105. This control system is characterized in that, in the start stage, the electrical machine, operating as an electric motor, is connected to the transmission, whilst a predetermined gear (preferably first gear) is engaged in the gearbox so that the vehicle is initially propelled purely by the electrical machine. In predetermined operating conditions, a change from the predetermined gear to a higher gear, preferably second gear, is then brought about and, during this gear change, the internal combustion engine is connected to the electrical machine, operating as a motor, in order to bring about starting of the internal combustion engine, and the internal combustion engine is then connected to the transmission so that, upon completion of the start stage, the vehicle is propelled by the internal combustion engine and possibly also by the electrical machine.

This known control system advantageously utilizes the advantages of stop-start operation (reduction of fuel consumption and of emissions of pollutant gases) with little impact on the driveability of the vehicle and on driving comfort.

However, the solution proposed in the above-mentioned International patent application has a limitation, which is represented by the low maximum torque which can be delivered by the electrical machine when it is operating as a motor. This limitation translates into a limitation of the possible acceleration of the motor vehicle, particularly during the start stage. If, during such a start stage, the driver demands the delivery of a high torque and hence a fast acceleration of the vehicle by fully depressing the accelerator pedal, such a demand can only be satisfied after the change from the predetermined gear to the higher gear. Clearly, this represents a disadvantage from the point of view of the driveability of the vehicle.

This disadvantage could indeed be at least partly prevented by the use of an electrical machine of larger dimensions and greater power, naturally equipped with an inverter and a storage battery of correspondingly greater power. However, the weight, size and cost of this solution are greater and in fact are unacceptable.

SUMMARY OF THE INVENTION

An aim of the present invention is therefore to provide an improved propulsion-control system which overcomes the disadvantages of systems according to the prior art outlined above, without requiring the use of a higher powered and more expensive electrical machine (and the respective accessories).

BRIEF DESCRIPTION OF THE DRAWINGS

Further characteristics and advantages of the invention will become clear from the following detailed description, given purely by way of non-limiting example, with reference to the appended drawings, in which.

DETAILED DESCRIPTION OF THE INVENTION

Figure 1:
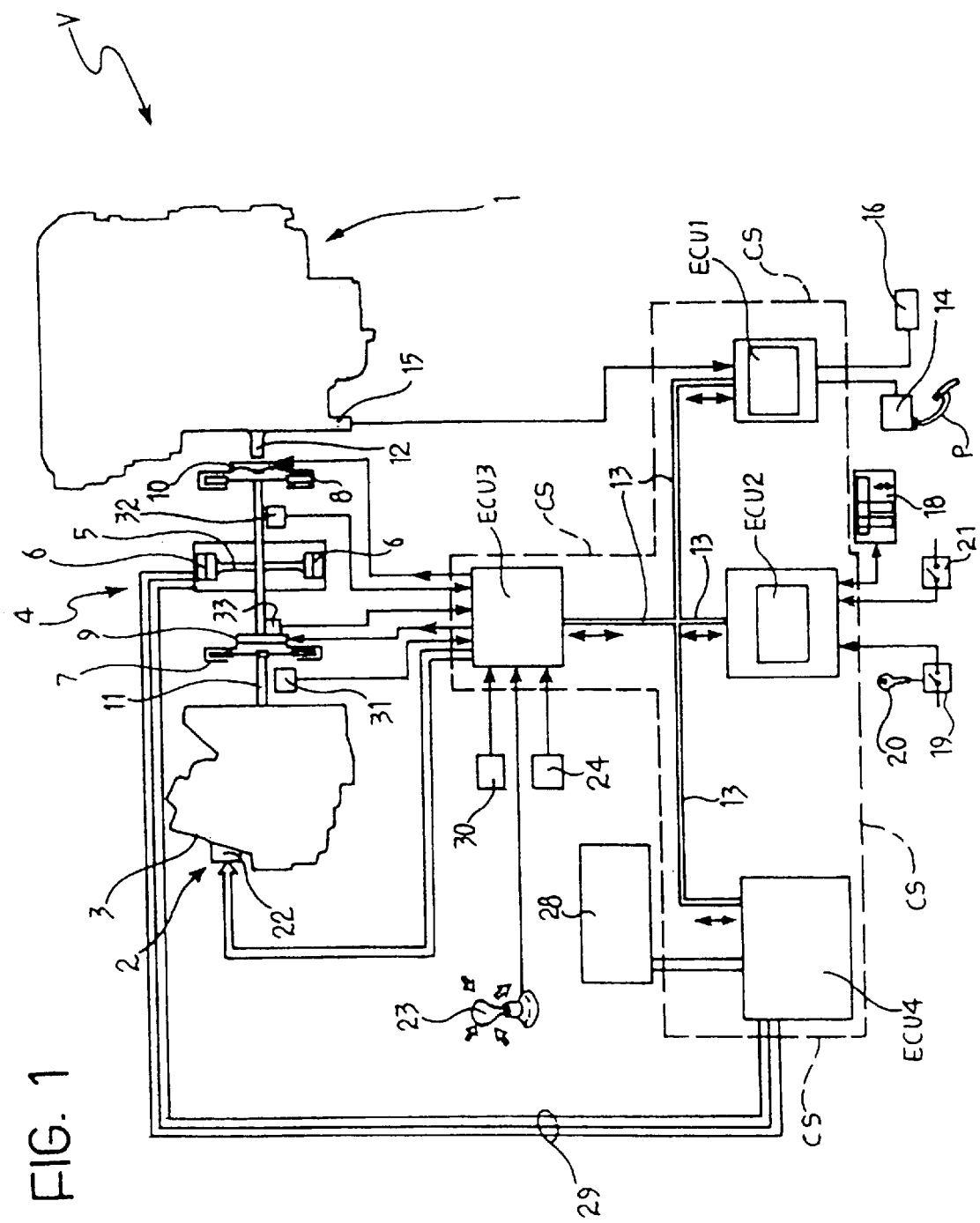
FIG. 1 is a schematic representation of a system according to the invention.

FIG. 1 shows, schematically and partially, a motor vehicle V provided with an internal combustion engine 1 as well as a transmission 2 including a gearbox 3 with discreet ratios, in particular, a gearbox with gears.

The gearbox 3 is of the so-called automatic or servo-assisted type, that is, it has actuator devices, for example, of the electrohydraulic type, for bringing about engagement/disengagement of the gears.

The motor vehicle V also has a reversible electrical machine 4 including a rotor 5 and a stator 6. This electrical machine 4 is interposed between the internal combustion engine 1 and the transmission 2 and can operate selectively as a generator and as an electric motor.

A first clutch and a second clutch, indicated 7 and 8 in FIG. 1, can be operated by respective actuators 9 and 10, for example, electrohydraulic actuators, which are operable selectively in order to control the coupling of the rotor 5 of the electrical machine 4 with the input shaft 11 of the transmission and with the shaft 12 of the internal combustion engine 1, respectively.

A control system, generally indicated CS, is associated with the above-described propulsion system. In the embodiment shown by way of example in FIG. 1, the control system CS comprises four electronic control units ECU1, ECU2, ECU3 and ECU4, interconnected by a communication network 13 operating, for example, in accordance with the CAN protocol.

The control unit ECU1 is basically a unit which supervises the management of the internal combustion engine 1.

Connected to this unit are a position sensor 14, associated with the accelerator pedal P, a sensor 15 for detecting the speed of rotation of the shaft 12 of the engine 1, and further sensors, generally indicated 16 in FIG. 1, such as a sensor for detecting the speed of movement of the vehicle, etc.

The control unit ECU2 is intended to control general functions of the motor vehicle and to coordinate the various other control units. To this unit are connected (amongst other things), an instrument panel 18 located on the dashboard, a general on/off switch 19 operable, for example, by a key 20, and a manually-operable switch 21 for selecting operation of the propulsion system with hybrid drive or, selectively, with purely electric drive.

The control unit ECU3 is intended to control the gearbox and is connected to the transducers, generally indicated 22 in the drawing, for the engagement/disengagement of the gears of the gearbox 3, to a manually-operable device for controlling the gearbox, such as a so-called joystick 23 equipped with sensors, to sensors 31 and 32 for providing signals indicative of the speed of rotation (revolutions per unit of time) of the rotor 5 of the electrical machine 4 and of the input shaft 11 of the transmission, respectively, as well as to an optional position sensor 33 for providing signals indicative of the position of the actuator 9 associated with the clutch 7 interposed between the electrical machine 4 and the transmission 3.

Further sensors, generally indicated 24, such as sensors for indicating the gear ratio actually engaged in the gearbox, are also connected to the control unit ECU3.

The control unit ECU3 is also connected to the actuators 9 and 12 associated with the clutches 7 and 8, respectively. A manually-operable selector 30 is also connected to the unit ECU3 and can be operated by the driver of the vehicle in order to render operative a first mode of operation in which the unit ECU3 brings about the gear changes in accordance with the commands imparted by the manual selection device 23, or a second mode of operation in which the gearbox is controlled completely automatically. In this second mode of operation, the gearbox is controlled automatically by the unit ECU3 on the basis of the operative conditions of the vehicle (signals supplied by the above-described sensors).

Finally, the control unit ECU4 supervises the control of the electrical machine 4. The output of this unit is connected to the electrical machine 4 by means of a three-phase line 29. A supply battery 28 is connected to the unit ECU 4.

The architecture of the control system CS, which is divided into four units, is given purely by way of example. As is clear to persons skilled in the art, all of the functions of the control system and, in particular, those which are described below, may be performed and controlled by a control system having different architecture or even produced in the form of a single microprocessor control unit.

The control system CS is arranged to control the operation of the internal combustion engine 1 of the electrical machine 4, of the clutches 7 and 8, and of the actuators 22 for the engagement/disengagement of the gears of the gearbox in predetermined manner, in dependence on the signals supplied by the sensors 14–16, 31–33 and, in the first mode of operation mentioned above, by the sensors associated with the manual selection device 23.

In particular, when the automatic method of control of the gearbox has been selected by means of the selector 30, the control system CS is arranged to implement a stop-start function having the purpose of reducing fuel consumption and pollutant emissions.

This stop-start function provides for the implementation of a stop stage in which the internal combustion engine 1 is disconnected from the electrical machine and from the transmission 2 by the disengagement of the clutch 8, in first predetermined operating conditions of the vehicle, which are detected by means of the above-mentioned sensors, for example, in conditions in which the motor vehicle is slowing down when travelling in a queue or in order to stop at traffic lights. During the stop stage, the internal combustion engine 1 is switched off under the control of the unit ECU1.

The stop stage is followed by a start stage which is started as a result of the occurrence of predetermined conditions, for example, of a command imparted by the driver, such as the operation of the accelerator pedal P.

During the start stage, the internal combustion engine 1 is restarted by means of the electrical machine 4, operating as a motor, and is then reconnected to the transmission 2, as will be described further below.

Figure 2A:
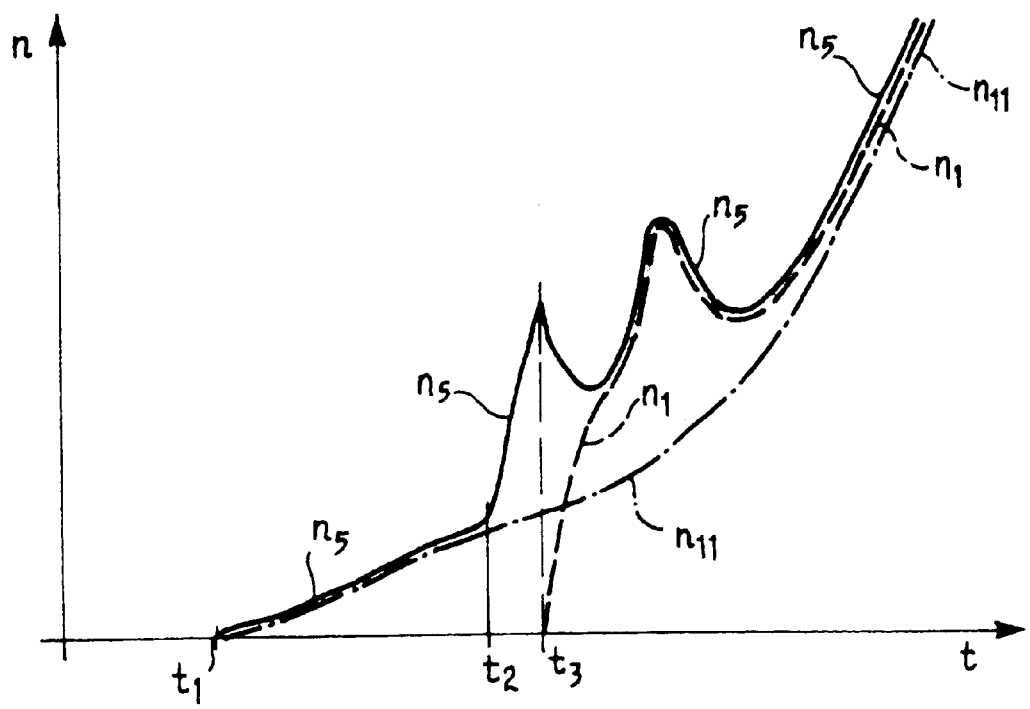
FIGS. 2a and 2b are graphs which show the behavior of some quantities in a control system according to the invention, as functions of the time t, given on the abscissa.

The control system CS is arranged, during the initial portion of the start stage, to bring about activation of the electrical machine 4 as an electric motor, whilst the clutch 8 is disengaged, and the clutch 7 is controlled continuously in a manner such that it transmits a torque to the shaft 11. In particular, the clutch 7 is controlled in a manner such that it can transmit, without slipping, a torque slightly greater than that actually delivered by the machine 4, to prevent unnecessary slipping and dissipation of energy. In this condition, the electrical machine 4 is the sole propulsion unit of the motor vehicle and its speed of rotation $n_5$ and the speed $n_{11}$ of the transmission input shaft 11 coincide. With reference to FIG. 2a, this activation takes place at a time $t_1$.

By means of the control unit ECU1, the control system CS monitors the value of the driving torque demanded by the driver, which corresponds to the degree of operation (the position) of the accelerator pedal P, in the course of the start stage. As soon as the torque demanded reaches a predetermined threshold value corresponding, for example, to an acceleration of the vehicle of 1.5 m/s$^2$, the system CS keeps the clutch 7 in a controlled, partially disengaged condition by means of the control unit ECU3 and the actuator 9 (time $t_2$ in FIGS. 2a and 2b) so as to apply a torque equal to the threshold value to the transmission input shaft 11, whilst the electrical machine 4 is required to provide the maximum torque which it can deliver.

This ensures a substantially uniform acceleration of the vehicle, corresponding to the torque threshold value, whilst the speed of rotation $n_5$ of the electrical machine 4 is not restrained by that $n_{11}$ of the transmission input shaft 11.

As soon as the speed of rotation $n_5$ of the electrical machine exceeds a predetermined threshold at least equal to the idling rate of revolution of the internal combustion engine 1 and as soon as the difference between the speed of rotation $n_5$ of the electrical machine and the speed $n_{11}$ of the transmission input shaft has exceeded a predetermined value, the control unit ECU3 brings about a first engagement of the clutch 8 by means of the actuator 10. Starting from a time indicated $t_3$ in FIGS. 2a and 2b, the shaft 12 of the internal combustion engine 1 is consequently rotated by the electrical machine 4 in order to be started.

The clutch 7 continues to be controlled in the manner indicated above, so that, as a result of the torque transmitted, the speed of rotation $n_{11}$ of the transmission input shaft 11 continues to increase whilst remaining below the speed of rotation $n_5$ of the electrical machine 5. This prevents the starting of the internal combustion engine being perceived by the user.

Figure 2B:
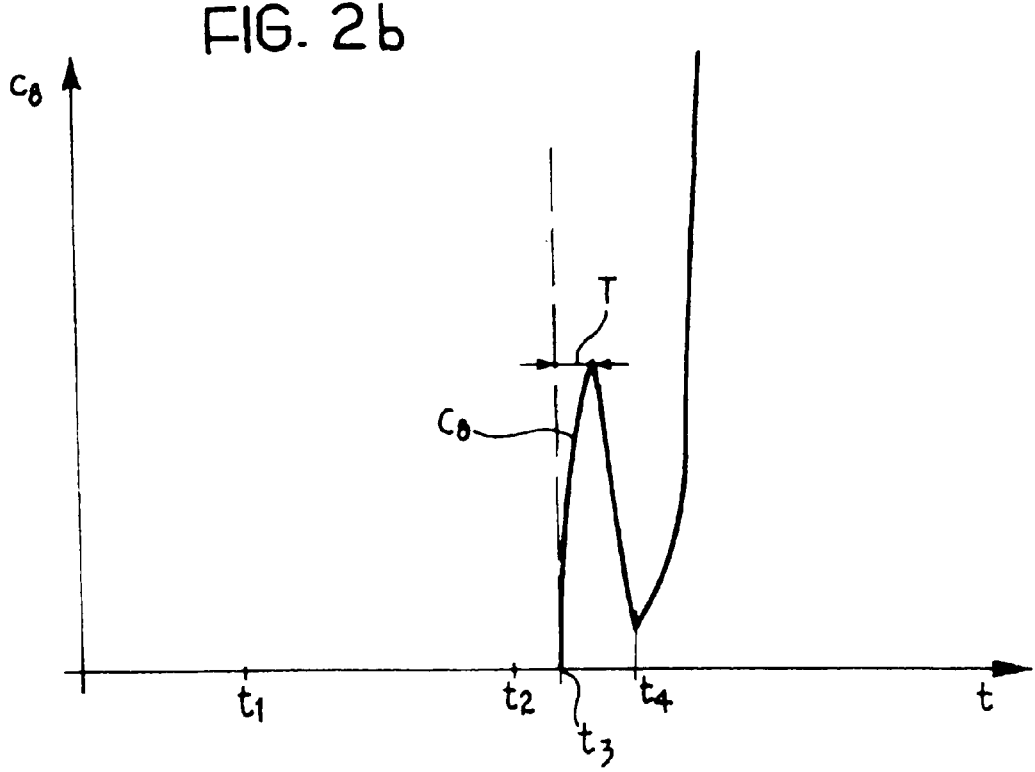

FIG. 2b shows qualitatively the behavior of the torque $C_8$ transmitted by the clutch 8 to the shaft 12 of the internal combustion engine 1. Starting from the time $t_4$, the torque $C_8$ increases abruptly.

The above-mentioned first engagement of the clutch 8 preferably has a duration T which is calculated in a manner such that the engine 1 manages to pass the first compression stage during the starting stage. After the period of time T, the clutch 8 is substantially disengaged again up to a time indicated $t_4$ in FIG. 2*b*, until the mean value of the resisting torque of the engine 1 during the starting stage is transmitted. This substantial disengagement of the clutch 8 enables the speed of rotation $n_{11}$ of the input shaft 11 of the transmission 2 to be "disconnected" from the speed of rotation of the propulsion unit "seen" by this shaft by means of the clutches 7 and 8, this propulsion unit being represented by the electrical machine 4 operating as a motor and by the started internal combustion engine 1, together.

Starting form the time $t_4$, at which the engine 1 is recognized as started, the clutch 8 is finally re-engaged, first partially and then completely.

The speed of rotation $n_1$ of the started internal combustion engine 1 and the speed of rotation $n_5$ of the rotor 5 of the electrical machine 4 thus become equal to one another, whilst the clutch 7 is progressively engaged, bringing about the restriction of the driving torque, and the speed of rotation $n_5$ of the shaft of the electrical machine is thus also brought to the value $n_{11}$ of the transmission input shaft 11.

The control system CS interrupts the operation of the electrical machine 4 as a motor by means of the unit ECU4, as soon as the torque delivered by the internal combustion engine 1 is adequate to satisfy the driver's torque demand, implemented by the accelerator pedal P.

The above-described control system prevents the vehicle from suffering a "hole " in the acceleration, which is perceived adversely by the driver, during a starting stage, when there is a sudden demand for a high driving torque by the driver. This is achieved, in particular, by controlled disengagement of the clutches during the start stage.

Naturally, the principle of the invention remaining the same, the forms of embodiment and details of construction may be varied widely with respect to those described and illustrated purely by way of non-limiting example, without thereby departing form the scope of the invention as defined in the appended claims.

What is claimed is:

1. A system for controlling propulsion for a motor vehicle, provided with:
    an internal combustion engine,
    a transmission including a gearbox provided with associated actuator means,
    a reversible electrical machine which includes a rotor and a stator, and which is interposed between the internal combustion engine and the transmission and is adapted to operate selectively as a generator and as an electric motor,
    a first clutch and a second clutch adapted to be operated selectively in order to control the coupling of the rotor of the electrical machine with the transmission and with the internal combustion engine, respectively,
    sensor means for providing electrical signals indicative of operating conditions of the vehicle, of the internal combustion engine, and of the electrical machine, and
    control means arranged to control the internal combustion engine, the electrical machine, the first clutch and the second clutch, as well as the gearbox actuator means, in dependence on the signals provided by the sensor means,
    the control means being arranged, to implement a stop-start function in which, in a stop stage, the internal combustion engine is disconnected from the electrical machine and from the transmission and is switched off in first predetermined operating conditions of the vehicle and then, upon the occurrence of second predetermined operating conditions, in a subsequent start stage, is automatically restarted by the electrical machine, operating as a motor, and is then reconnected to the transmission,
    the control means being arranged to bring about during the start stage:
        activation of the electrical machine as a motor whilst the second clutch is substantially disengaged and the first clutch is engaged in controlled manner in order to bring about driving of the transmission by the electrical machine,
        monitoring of the driving torque demanded, which corresponds to the degree of operation of the accelerator pedal and, when this torque reaches a predetermined threshold value:
            partial disengagement of the first clutch, controlled in a manner such that a torque equal to the threshold value continues to be applied to the transmission whilst the electrical machine is caused to deliver substantially its maximum torque, and
            a first engagement of the second clutch as soon as the speed of rotation of the electrical machine exceeds a predetermined threshold so that the internal combustion engine is rotated in order to be started by means of the electrical machine.

2. A system according to claim 1 in which the control means are arranged to bring about the first engagement of the second clutch when the difference between the speed of rotation of the electrical machine and the speed of rotation of the input shaft of the transmission exceeds a predetermined value.

3. A system according to claim 1 in which the first engagement of the second clutch has a predetermined duration, after which the second clutch is substantially disengaged again and is then finally re-engaged.

4. A system according to claim 3 in which, after the final re-engagement of the second clutch, the first clutch is also progressively re-engaged.

5. A method of controlling propulsion in a motor vehicle provided with:
    an internal combustion engine,
    a transmission including a gearbox provided with associated actuator means,
    a reversible electrical machine which includes a rotor and a stator, and which is interposed between the internal combustion engine and the transmission and is adapted to operate selectively as a generator and as an electric motor,
    a first clutch and a second clutch adapted to be operated selectively in order to control the coupling of the rotor of the electrical machine with the transmission and with the internal combustion engine, respectively,
    the method comprising the implementation of a stop-start function including:
        initiating a stop stage by disconnecting and switching off the internal combustion engine from the electrical machine and from the transmission, and
        restarting the internal combustion engine by means of the electrical machine operating as a motor and then reconnecting the engine to the transmission;

wherein during the start stage the method includes:
  starting the electrical machine as a motor whilst the second clutch is substantially disengaged and the first clutch is engaged in controlled manner in order to bring about driving of the transmission by the electrical machine,
  monitoring the driving torque demanded, which corresponds to the degree of operation of the accelerator pedal of the motor vehicle, and when this torque reaches a predetermined threshold value:
    partially disengaging the first clutch in a controlled manner such that a torque equal to the threshold value continues to be applied to the transmission whilst the electrical machine is caused to deliver substantially its maximum torque, and
    initiating a first engagement of the second clutch as soon as the speed of rotation of the electrical machine exceeds a predetermined threshold, so as to rotate the internal combustion engine in order to start it by means of the electrical machine.

6. A method according to claim 5 in which the first engagement of the second clutch is brought about when the difference between the speed of rotation of the electrical machine and the speed of rotation of the input shaft of the transmission exceeds a predetermined value.

7. A method according to claim 5 in which the first engagement of the second clutch has a predetermined duration and the second clutch is then substantially disengaged and is then finally re-engaged.

8. A method according to claim 7 in which, after the final re-engagement of the second clutch, the first clutch is also progressively re-engaged.

* * * * *